United States Patent
Kristiansen et al.

(10) Patent No.: US 10,440,073 B2
(45) Date of Patent: Oct. 8, 2019

(54) USER INTERFACE FOR PROXIMITY BASED TELECONFERENCE TRANSFER

(71) Applicant: CISCO TECHNOLOGY, INC., San Jose, CA (US)

(72) Inventors: Ivan Marius Kristiansen, Oslo (NO); Vigleik Norheim, Oslo (NO); Ingrid Kvaal, Oslo (NO); Fredrik Stai, Son (NO); Paula Ironside, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 123 days.

(21) Appl. No.: 15/484,716

(22) Filed: Apr. 11, 2017

(65) Prior Publication Data
US 2018/0292972 A1    Oct. 11, 2018

(51) Int. Cl.
*H04N 7/15* (2006.01)
*G06F 3/048* (2013.01)
(Continued)

(52) U.S. Cl.
CPC .......... *H04L 65/403* (2013.01); *G06F 3/0488* (2013.01); *H04L 12/1827* (2013.01); *H04L 65/1059* (2013.01); *H04L 65/1083* (2013.01); *H04M 1/72522* (2013.01); *H04M 1/72583* (2013.01); *H04M 3/56* (2013.01); *H04M 3/58* (2013.01); *H04N 7/147* (2013.01); *G06F 3/167* (2013.01); *H04L 12/1822* (2013.01); *H04M 2201/42* (2013.01); *H04M 2203/2094* (2013.01); *H04N 2007/145* (2013.01)

(58) Field of Classification Search
CPC .. G06F 3/048; G06F 3/00; H04N 7/14; H04N 7/00; H04N 7/15
See application file for complete search history.

(56) References Cited

U.S. PATENT DOCUMENTS 4,460,807 A    7/1984    Kerr et al.
4,890,257 A    12/1989    Anthias et al.
(Continued)

FOREIGN PATENT DOCUMENTS

CN    101055561    10/2007
CN    101076060    11/2007
(Continued)

OTHER PUBLICATIONS

Author Unknown, "A Primer on the H.323 Series Standard," Version 2.0, available at http://www.packetizer.com/volp/h323/papers/primer/, retrieved on Dec. 20, 2006, 17 pages.
(Continued)

*Primary Examiner* — Hugo Molina
(74) *Attorney, Agent, or Firm* — Polsinelli PC

(57) ABSTRACT

A method for transferring a teleconference between a mobile device and a conference center. The method includes identifying, by a mobile device, a candidate meeting center system for transfer of a teleconference conducted on the mobile device, and in response to identifying the candidate meeting center system, generating a user interface (UI) to provide one or more user selectable icons, the user selectable icons configured to facilitate transfer of the teleconference from the mobile device to the candidate meeting center system.

17 Claims, 13 Drawing Sheets

(51) Int. Cl.
*H04L 29/06* (2006.01)
*H04M 1/725* (2006.01)
*G06F 3/0488* (2013.01)
*H04L 12/18* (2006.01)
*H04N 7/14* (2006.01)
*H04M 3/56* (2006.01)
*H04M 3/58* (2006.01)
*G06F 3/16* (2006.01)

(56) References Cited

U.S. PATENT DOCUMENTS

| | | | |
|---|---|---|---|
| 4,977,605 | A | 12/1990 | Fardeau et al. |
| 5,293,430 | A | 3/1994 | Shiau et al. |
| 5,694,563 | A | 12/1997 | Belfiore et al. |
| 5,699,082 | A | 12/1997 | Marks et al. |
| 5,745,711 | A | 4/1998 | Kitahara et al. |
| 5,767,897 | A | 6/1998 | Howell |
| 5,825,858 | A | 10/1998 | Shaffer et al. |
| 5,874,962 | A | 2/1999 | de Judicibus et al. |
| 5,889,671 | A | 3/1999 | Autermann et al. |
| 5,917,537 | A | 6/1999 | Lightfoot et al. |
| 5,995,096 | A | 11/1999 | Kitahara et al. |
| 6,023,606 | A | 2/2000 | Monte et al. |
| 6,040,817 | A | 3/2000 | Sumikawa |
| 6,075,531 | A | 6/2000 | DeStefano |
| 6,085,166 | A | 7/2000 | Beckhardt et al. |
| 6,191,807 | B1 | 2/2001 | Hamada et al. |
| 6,300,951 | B1 | 10/2001 | Filetto et al. |
| 6,392,674 | B1 | 5/2002 | Hiraki et al. |
| 6,424,370 | B1 | 7/2002 | Courtney |
| 6,463,473 | B1 | 10/2002 | Gubbi |
| 6,553,363 | B1 | 4/2003 | Hoffman |
| 6,554,433 | B1 | 4/2003 | Holler |
| 6,573,913 | B1 | 6/2003 | Butler et al. |
| 6,646,997 | B1 | 11/2003 | Baxley et al. |
| 6,665,396 | B1 | 12/2003 | Khouri et al. |
| 6,700,979 | B1 | 3/2004 | Washiya |
| 6,711,419 | B1 | 3/2004 | Mori |
| 6,754,321 | B1 | 6/2004 | Innes et al. |
| 6,754,335 | B1 | 6/2004 | Shaffer et al. |
| RE38,609 | E | 10/2004 | Chen et al. |
| 6,816,464 | B1 | 11/2004 | Scott et al. |
| 6,865,264 | B2 | 3/2005 | Berstis |
| 6,938,208 | B2 | 8/2005 | Reichardt |
| 6,978,499 | B2 | 12/2005 | Gallant et al. |
| 7,046,134 | B2 | 5/2006 | Hansen |
| 7,046,794 | B2 | 5/2006 | Piket et al. |
| 7,058,164 | B1 | 6/2006 | Chan et al. |
| 7,058,710 | B2 | 6/2006 | McCall et al. |
| 7,062,532 | B1 | 6/2006 | Sweat et al. |
| 7,085,367 | B1 | 8/2006 | Lang |
| 7,124,164 | B1 | 10/2006 | Chemtob |
| 7,149,499 | B1 | 12/2006 | Oran et al. |
| 7,180,993 | B2 | 2/2007 | Hamilton |
| 7,209,475 | B1 | 4/2007 | Shaffer et al. |
| 7,340,151 | B2 | 3/2008 | Taylor et al. |
| 7,366,310 | B2 | 4/2008 | Stinson et al. |
| 7,418,664 | B2 | 8/2008 | Ben-Shachar et al. |
| 7,441,198 | B2 | 10/2008 | Dempski et al. |
| 7,478,339 | B2 | 1/2009 | Pettiross et al. |
| 7,500,200 | B2 | 3/2009 | Kelso et al. |
| 7,530,022 | B2 | 5/2009 | Ben-Shachar et al. |
| 7,552,177 | B2 | 6/2009 | Kessen et al. |
| 7,577,711 | B2 | 8/2009 | McArdle |
| 7,584,258 | B2 | 9/2009 | Maresh |
| 7,587,028 | B1 | 9/2009 | Broerman et al. |
| 7,606,714 | B2 | 10/2009 | Williams et al. |
| 7,606,862 | B2 | 10/2009 | Swearingen et al. |
| 7,620,902 | B2 | 11/2009 | Manion et al. |
| 7,634,533 | B2 | 12/2009 | Rudolph et al. |
| 7,774,407 | B2 | 8/2010 | Daly et al. |
| 7,792,277 | B2 | 9/2010 | Shaffer et al. |
| 7,830,814 | B1 | 11/2010 | Allen et al. |
| 7,840,013 | B2 | 11/2010 | Dedieu et al. |
| 7,840,980 | B2 | 11/2010 | Gutta, Sr. |
| 7,881,450 | B1 | 2/2011 | Gentle et al. |
| 7,920,160 | B2 | 4/2011 | Tamaru et al. |
| 7,956,869 | B1 | 6/2011 | Gilra |
| 7,986,372 | B2 | 7/2011 | Ma et al. |
| 7,995,464 | B1 | 8/2011 | Croak et al. |
| 8,059,557 | B1 | 11/2011 | Sigg et al. |
| 8,081,205 | B2 | 12/2011 | Baird et al. |
| 8,140,973 | B2 | 3/2012 | Sandquist et al. |
| 8,169,463 | B2 | 5/2012 | Enstad et al. |
| 8,219,624 | B2 | 7/2012 | Haynes et al. |
| 8,274,893 | B2 | 9/2012 | Bansal et al. |
| 8,290,998 | B2 | 10/2012 | Stienhans et al. |
| 8,301,883 | B2 | 10/2012 | Sundaram et al. |
| 8,340,268 | B2 | 12/2012 | Knaz |
| 8,358,327 | B2 | 1/2013 | Duddy |
| 8,423,615 | B1 | 4/2013 | Hayes |
| 8,428,234 | B2 | 4/2013 | Knaz |
| 8,433,061 | B2 | 4/2013 | Cutler |
| 8,434,019 | B2 | 4/2013 | Nelson |
| 8,456,507 | B1 | 6/2013 | Mallappa et al. |
| 8,462,103 | B1 | 6/2013 | Moscovitch et al. |
| 8,478,848 | B2 | 7/2013 | Minert |
| 8,520,370 | B2 | 8/2013 | Waitzman, III et al. |
| 8,625,749 | B2 | 1/2014 | Jain et al. |
| 8,630,208 | B1 | 1/2014 | Kjeldaas |
| 8,638,354 | B2 | 1/2014 | Leow et al. |
| 8,645,464 | B2 | 2/2014 | Zimmet et al. |
| 8,675,847 | B2 | 3/2014 | Shaffer et al. |
| 8,694,587 | B2 | 4/2014 | Chaturvedi et al. |
| 8,694,593 | B1 | 4/2014 | Wren et al. |
| 8,706,539 | B1 | 4/2014 | Mohler |
| 8,732,149 | B2 | 5/2014 | Lida et al. |
| 8,738,080 | B2 | 5/2014 | Nhiayi et al. |
| 8,751,572 | B1 | 6/2014 | Behforooz et al. |
| 8,831,505 | B1 | 9/2014 | Seshadri |
| 8,850,203 | B2 | 9/2014 | Sundaram et al. |
| 8,860,774 | B1 | 10/2014 | Sheeley et al. |
| 8,874,644 | B2 | 10/2014 | Allen et al. |
| 8,890,924 | B2 | 11/2014 | Wu |
| 8,892,646 | B2 | 11/2014 | Chaturvedi et al. |
| 8,914,444 | B2 | 12/2014 | Hladik, Jr. |
| 8,914,472 | B1 | 12/2014 | Lee et al. |
| 8,924,862 | B1 | 12/2014 | Luo |
| 8,930,840 | B1 | 1/2015 | Riskó et al. |
| 8,947,493 | B2 | 2/2015 | Lian et al. |
| 8,972,494 | B2 | 3/2015 | Chen et al. |
| 9,003,445 | B1 | 4/2015 | Rowe |
| 9,031,839 | B2 | 5/2015 | Thorsen et al. |
| 9,032,028 | B2 | 5/2015 | Davidson et al. |
| 9,075,572 | B2 | 7/2015 | Ayoub et al. |
| 9,118,612 | B2 | 8/2015 | Fish et al. |
| 9,131,017 | B2 | 9/2015 | Kurupacheril et al. |
| 9,137,376 | B1 | 9/2015 | Basart et al. |
| 9,143,729 | B2 | 9/2015 | Anand et al. |
| 9,165,281 | B2 | 10/2015 | Orsolini et al. |
| 9,197,701 | B1 | 11/2015 | Petrov et al. |
| 9,197,848 | B2 | 11/2015 | Felkai et al. |
| 9,201,527 | B2 | 12/2015 | Kripalani et al. |
| 9,203,875 | B2 | 12/2015 | Huang et al. |
| 9,204,099 | B2 | 12/2015 | Brown |
| 9,219,735 | B2 | 12/2015 | Hoard et al. |
| 9,246,855 | B2 | 1/2016 | Maehiro |
| 9,258,033 | B2 | 2/2016 | Showering |
| 9,268,398 | B2 | 2/2016 | Tipirneni |
| 9,298,342 | B2 | 3/2016 | Zhang et al. |
| 9,323,417 | B2 | 4/2016 | Sun et al. |
| 9,335,892 | B2 | 5/2016 | Ubillos |
| 9,349,119 | B2 | 5/2016 | Desai et al. |
| 9,367,224 | B2 | 6/2016 | Ananthakrishnan et al. |
| 9,369,673 | B2 | 6/2016 | Ma et al. |
| 9,407,621 | B2 | 8/2016 | Vakil et al. |
| 9,432,512 | B2 | 8/2016 | You |
| 9,449,303 | B2 | 9/2016 | Underhill et al. |
| 9,467,848 | B1* | 10/2016 | Song ............ G06F 3/0488 |
| 9,495,664 | B2 | 11/2016 | Cole et al. |
| 9,513,861 | B2 | 12/2016 | Lin et al. |
| 9,516,022 | B2 | 12/2016 | Borzycki et al. |
| 9,525,711 | B2 | 12/2016 | Ackerman et al. |

(56) References Cited

U.S. PATENT DOCUMENTS

| | | |
|---|---|---|
| 9,553,799 B2 | 1/2017 | Tarricone et al. |
| 9,563,480 B2 | 2/2017 | Messerli et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,667,799 B2 | 5/2017 | Olivier et al. |
| 9,674,625 B2 | 6/2017 | Armstrong-Mutner |
| 9,762,709 B1 | 9/2017 | Snyder et al. |
| 2001/0030661 A1 | 10/2001 | Reichardt |
| 2002/0018051 A1 | 2/2002 | Singh |
| 2002/0076003 A1 | 6/2002 | Zellner et al. |
| 2002/0078153 A1 | 6/2002 | Chung et al. |
| 2002/0140736 A1 | 10/2002 | Chen |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0068087 A1 | 4/2003 | Wu et al. |
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0131774 A1 | 6/2005 | Huxter |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0083305 A1 | 4/2006 | Dougherty et al. |
| 2006/0084471 A1 | 4/2006 | Walter |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0139626 A1 | 6/2007 | Saleh et al. |
| 2007/0150453 A1 | 6/2007 | Morita |
| 2007/0168444 A1 | 7/2007 | Chen et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0107255 A1 | 5/2008 | Geva et al. |
| 2008/0133663 A1 | 6/2008 | Lentz |
| 2008/0154863 A1 | 6/2008 | Goldstein |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0132949 A1 | 5/2009 | Bosarge |
| 2009/0193327 A1 | 7/2009 | Roychoudhuri et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1 | 1/2010 | Xiao et al. |
| 2010/0005402 A1 | 1/2010 | George et al. |
| 2010/0031192 A1 | 2/2010 | Kong |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0087745 A1 | 4/2011 | O'Sullivan et al. |
| 2011/0117535 A1 | 5/2011 | Benko et al. |
| 2011/0131498 A1 | 6/2011 | Chao et al. |
| 2011/0154427 A1 | 6/2011 | Wei |
| 2011/0217966 A1* | 9/2011 | McDonald ............. H04M 3/42 455/416 |
| 2011/0230209 A1 | 9/2011 | Kilian |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0179502 A1 | 7/2012 | Farooq et al. |
| 2012/0190386 A1 | 7/2012 | Anderson |
| 2012/0192075 A1 | 7/2012 | Ebtekar et al. |

(56) References Cited

U.S. PATENT DOCUMENTS

| | | |
|---|---|---|
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0278727 A1* | 11/2012 | Ananthakrishnan ............ G06F 3/0486 715/748 |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |
| 2013/0002801 A1 | 1/2013 | Mock |
| 2013/0027425 A1 | 1/2013 | Yuan |
| 2013/0029648 A1* | 1/2013 | Soundrapandian ............ H04M 1/7253 455/416 |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0106976 A1 | 5/2013 | Chu et al. |
| 2013/0106977 A1* | 5/2013 | Chu ............ H04N 7/142 348/14.02 |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0157636 A1* | 6/2013 | Ryan ............ H04W 4/16 455/417 |
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0210496 A1 | 8/2013 | Zakarias et al. |
| 2013/0211826 A1 | 8/2013 | Mannby |
| 2013/0212202 A1 | 8/2013 | Lee |
| 2013/0212287 A1* | 8/2013 | Chappelle ............ H04M 3/58 709/227 |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0252669 A1 | 9/2013 | Nhiayi |
| 2013/0263020 A1 | 10/2013 | Heiferman et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2013/0342637 A1* | 12/2013 | Felkai ............ H04N 7/14 348/14.08 |
| 2014/0012990 A1 | 1/2014 | Ko |
| 2014/0028781 A1 | 1/2014 | MacDonald |
| 2014/0040404 A1 | 2/2014 | Pujare et al. |
| 2014/0040819 A1 | 2/2014 | Duffy |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki et al. |
| 2014/0111597 A1 | 4/2014 | Anderson et al. |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0195557 A1 | 7/2014 | Oztaskent et al. |
| 2014/0198175 A1 | 7/2014 | Shaffer et al. |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0282888 A1 | 9/2014 | Brooksby et al. |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0358264 A1 | 12/2014 | Long et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0109399 A1* | 4/2015 | Kuscher ............ H04N 7/15 348/14.02 |
| 2015/0113050 A1 | 4/2015 | Stahl |
| 2015/0113369 A1 | 4/2015 | Chan et al. |
| 2015/0128068 A1 | 5/2015 | Kim |
| 2015/0163455 A1* | 6/2015 | Brady ............ H04N 7/15 348/14.08 |
| 2015/0172120 A1 | 6/2015 | Dwarampudi et al. |
| 2015/0178626 A1 | 6/2015 | Pielot et al. |
| 2015/0215365 A1 | 7/2015 | Shaffer et al. |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0350126 A1 | 12/2015 | Xue |
| 2015/0350267 A1 | 12/2015 | Cutler et al. |
| 2015/0350448 A1* | 12/2015 | Coffman ............ H04M 3/42263 379/212.01 |
| 2015/0373063 A1 | 12/2015 | Vashishtha et al. |
| 2015/0373414 A1 | 12/2015 | Kinoshita |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0165056 A1 | 6/2016 | Bargetzi et al. |
| 2016/0173537 A1 | 6/2016 | Kumar et al. |
| 2016/0182580 A1 | 6/2016 | Nayak |
| 2016/0266609 A1 | 9/2016 | McCracken |
| 2016/0269411 A1 | 9/2016 | Malachi |
| 2016/0277461 A1 | 9/2016 | Sun et al. |
| 2016/0283909 A1 | 9/2016 | Adiga |
| 2016/0307165 A1 | 10/2016 | Grodum et al. |

(56) References Cited

U.S. PATENT DOCUMENTS

| | | | |
|---|---|---|---|
| 2016/0309037 | A1 | 10/2016 | Rosenberg et al. |
| 2016/0321347 | A1 | 11/2016 | Zhou et al. |
| 2017/0006162 | A1 | 1/2017 | Bargetzi et al. |
| 2017/0006446 | A1 | 1/2017 | Harris et al. |
| 2017/0070706 | A1 | 3/2017 | Ursin et al. |
| 2017/0093874 | A1 | 3/2017 | Uthe |
| 2017/0104961 | A1 | 4/2017 | Pan et al. |
| 2017/0171260 | A1 | 6/2017 | Jerrard-Dunne et al. |
| 2017/0324850 | A1 | 11/2017 | Snyder et al. |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| WO | WO 98/55903 | 12/1998 |
| WO | WO 2008/139269 | 11/2008 |
| WO | WO 2012/167262 | 12/2012 |
| WO | WO 2014/118736 | 8/2014 |

OTHER PUBLICATIONS

Author Unknown, "Active screen follows mouse and dual monitors," KDE Community Forums, Apr. 13, 2010, 3 page.

Author Unknown, "Implementing Media Gateway Control Protocols" A RADVision White Paper, Jan. 27, 2002, 16 pages.

Averusa, "Interactive Video Conferencing K-12 applications," "Interactive Video Conferencing K-12 applications" copyright 2012. http://www.averusa.com/education/downloads/hvc brochure goved. pdf (last accessed Oct. 11, 2013).

Cisco Systems, Inc., "Cisco WebEx Meetings Server System Requirements release 1.5." 30 pages, Aug. 14, 2013.

Cisco White Paper, "Web Conferencing: Unleash the Power of Secure, Real-Time Collaboration," pp. 1-8, 2014.

Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).

Clauser, Grant, et al., "Is the Google Home the voice-controlled speaker for you?," The Wire Cutter, Nov. 22, 2016, pp. 1-15.

Cole, Camille, et al., "Videoconferencing for K-12 Classrooms," Second Edition (excerpt), http://www.iste.org/docs/excerpts/VIDCO2-excerpt.pdf (last accessed Oct. 11, 2013), 2009.

Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed Oct. 11, 2013).

InFocus, "Mondopad," Mondopad. http://www.infocus.com/sites/default/files/InFocus-Mondopad-INF5520a-INF7021-Datasheet-EN. pdf (last accessed Oct. 11, 2013), 2013.

MacCormick, John, "Video Chat with Multiple Cameras," CSCW '13, Proceedings of the 2013 conference on Computer supported cooperative work companion, pp. 195-198, ACM, New York, NY, USA, 2013.

Microsoft, "Positioning Objects on Multiple Display Monitors," Aug. 12, 2012, 2 pages.

Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900630 dated Oct. 12, 2011 (last accessed Oct. 11, 2013).

Nu-Star Technologies, "Interactive Whiteboard Conferencing," Interactive Whiteboard Conferencing. http://www.nu-star.com/interactive-conf.php dated 2013 (last accessed Oct. 11, 2013).

Polycom, "Polycom RealPresence Mobile: Mobile Telepresence & Video Conferencing," http://www.polycom.com/products-services/hd-teleoresence-video-conferencing/realpresence-mobile.html#stab1 (last accessed Oct. 11, 2013), 2013.

Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.

Polycom, "Polycom UC Board, Transforming ordinary surfaces into virtual whiteboards" 2012, Polycom, Inc., San Jose, CA, http://www.uatg.com/pdf/polycom/polycom-uc-board- datasheet.pdf, (last accessed Oct. 11, 2013).

Stodle. Daniel, et al., "Gesture-Based, Touch-Free Multi-User Gaming on Wall-Sized, High-Resolution Tiled Displays," 2008, 13 pages.

Thompson, Phil, et al., "Agent Based Ontology Driven Virtual Meeting Assistant," Future Generation Information Technology, Springer Berlin Heidelberg, 2010, 4 pages.

TNO, "Multi-Touch Interaction Overview," Dec. 1, 2009, 12 pages.

Toga, James, et al., "Demystifying Multimedia Conferencing Over the Internet Using the H.323 Set of Standards," Intel Technology Journal Q2, 1998, 11 pages.

Ubuntu, "Force Unity to open new window on the screen where the cursor is?" Sep. 16, 2013, 1 page.

VB Forums, "Pointapi," Aug. 8, 2001, 3 pages.

Vidyo, "VidyoPanorama," VidyoPanorama—http://www.vidyo.com/products/vidyopartorama/ dated 2013 (last accessed Oct. 11, 2013).

Choi, Jae Young, et al; "Towards an Automatic Face Indexing System for Actor-based Video Services in an IPTV Environment," IEEE Transactions on 56, No. 1 (2010): 147-155.

Cisco Systems, Inc. "Cisco webex: WebEx Meeting Center User Guide for Hosts, Presenters, and Participants" © 1997-2013, pp. 1-394 plus table of contents.

Cisco Systems, Inc., "Cisco Webex Meetings for iPad and iPhone Release Notes," Version 5.0, Oct. 2013, 5 pages.

Cisco Systems, Inc., "Cisco Unified Personal Communicator 8.5", 2011, 9 pages.

Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.

Grothaus, Michael, "How Interactive Product Placements Could Save Television," Jul. 25, 2013, 4 pages.

Hannigan, Nancy Kruse, et al., The IBM Lotus Samteime VB Family Extending the IBM Unified Communications and Collaboration Strategy (2007), available at http://www.ibm.com/developerworks/lotust/library/sametime8-new/, 10 pages.

Hirschmann, Kenny, "TWIDDLA: Smarter Than the Average Whiteboard," Apr. 17, 2014, 2 pages.

Nyamgondalu, Nagendra, "Lotus Notes Calendar and Scheduling Explained!" IBM, Oct. 18, 2004, 10 pages.

Schreiber, Danny, "The Missing Guide for Google Hangout Video Calls," Jun. 5, 2014, 6 pages.

Shervington, Martin, "Complete Guide to Google Hangouts for Businesses and Individuals," Mar. 20, 2014, 15 pages.

Shi, Saiqi, et al, "Notification That a Mobile Meeting Attendee is Driving", May 20, 2013, 13 pages.

International Search Report and Written Opinion from the International Searching Authority, dated Jul. 19, 2018, 14 pages, for corresponding International Patent Application No. PCT/US18/27087.

* cited by examiner

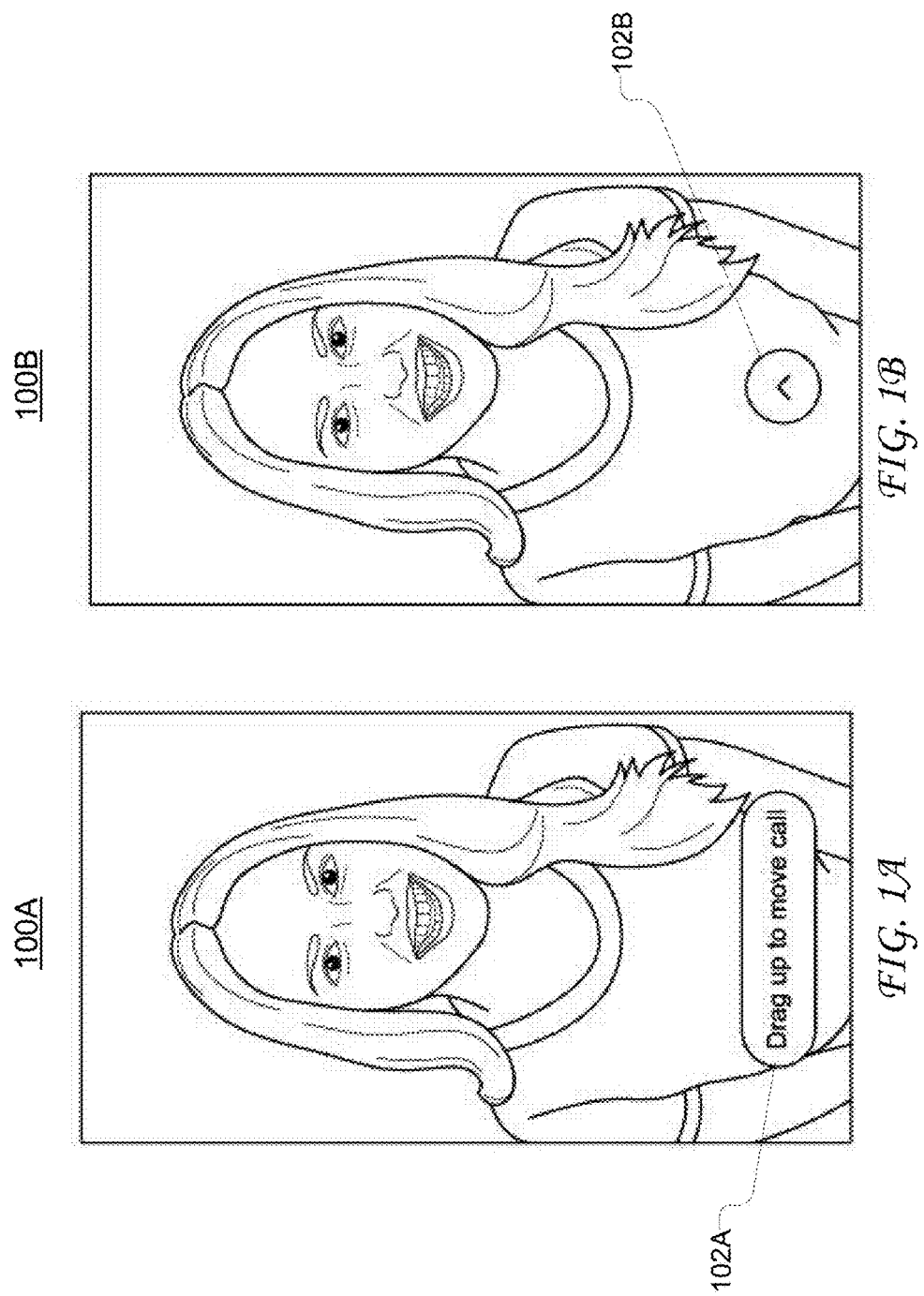

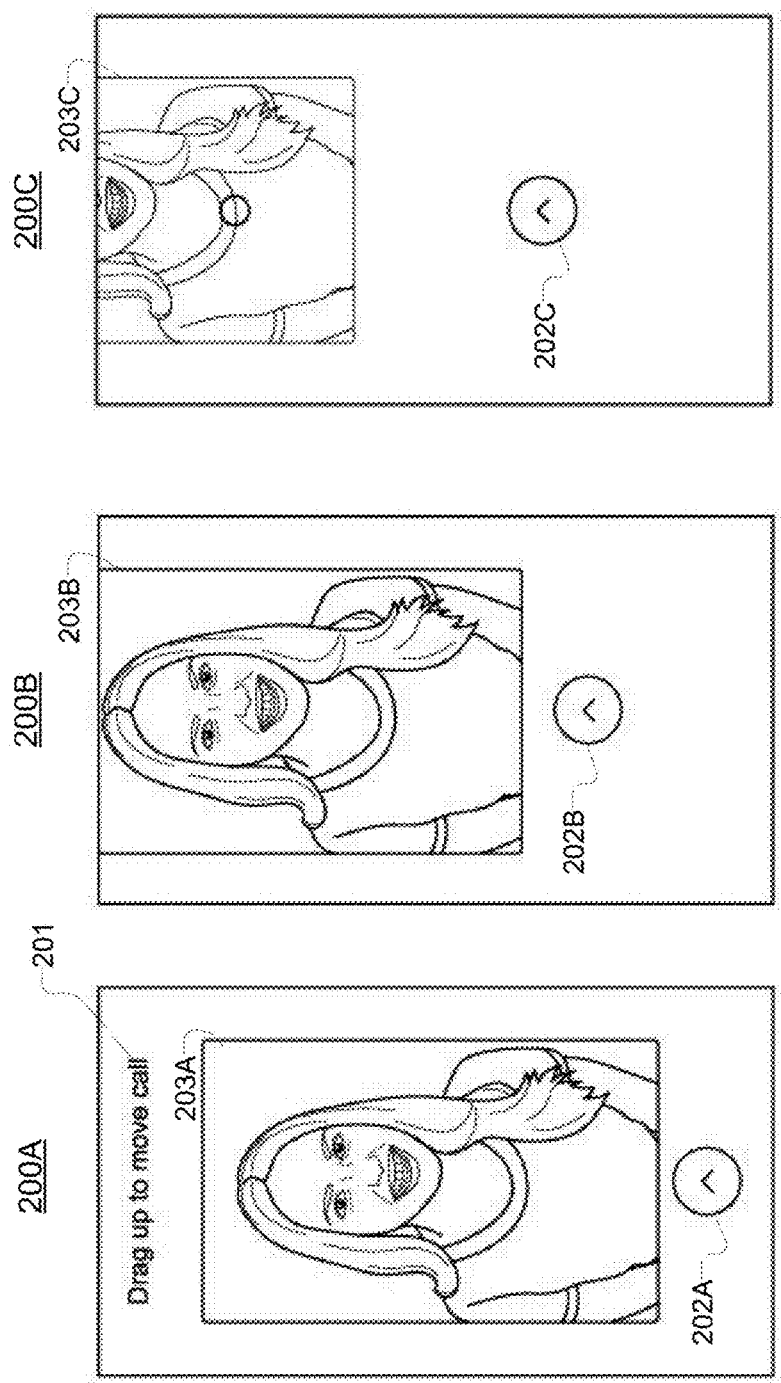

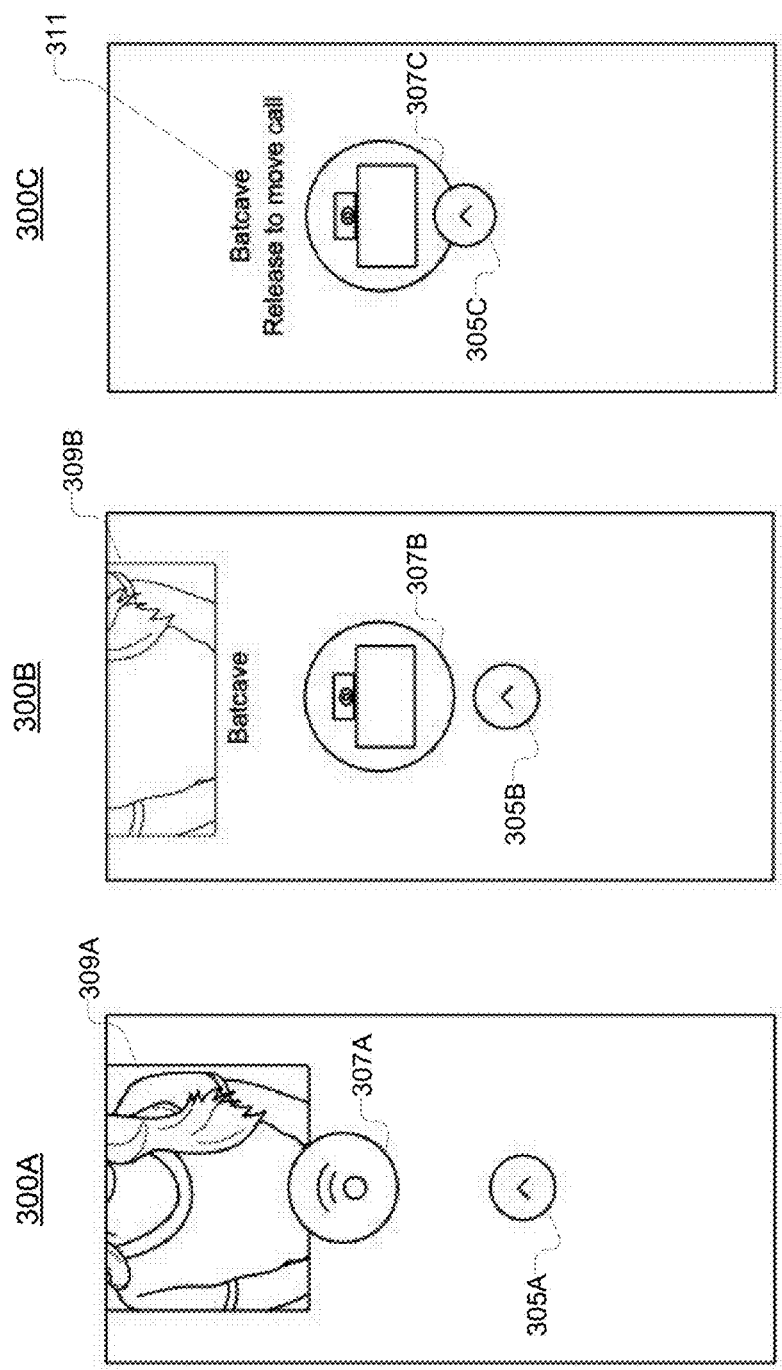

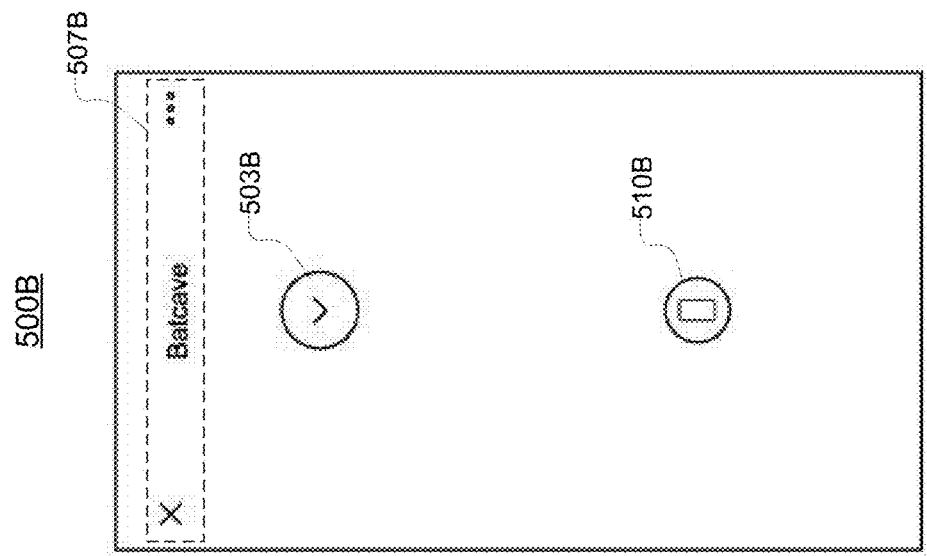
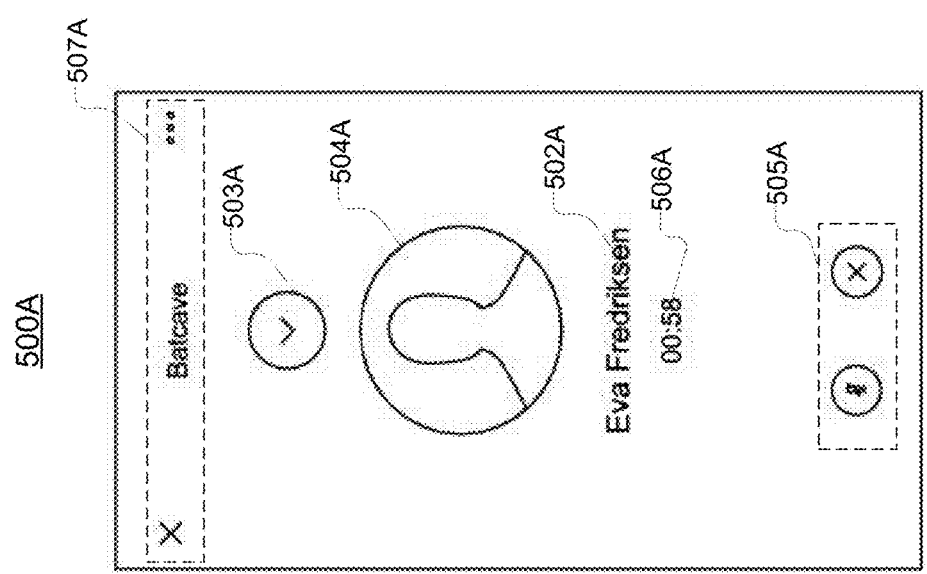

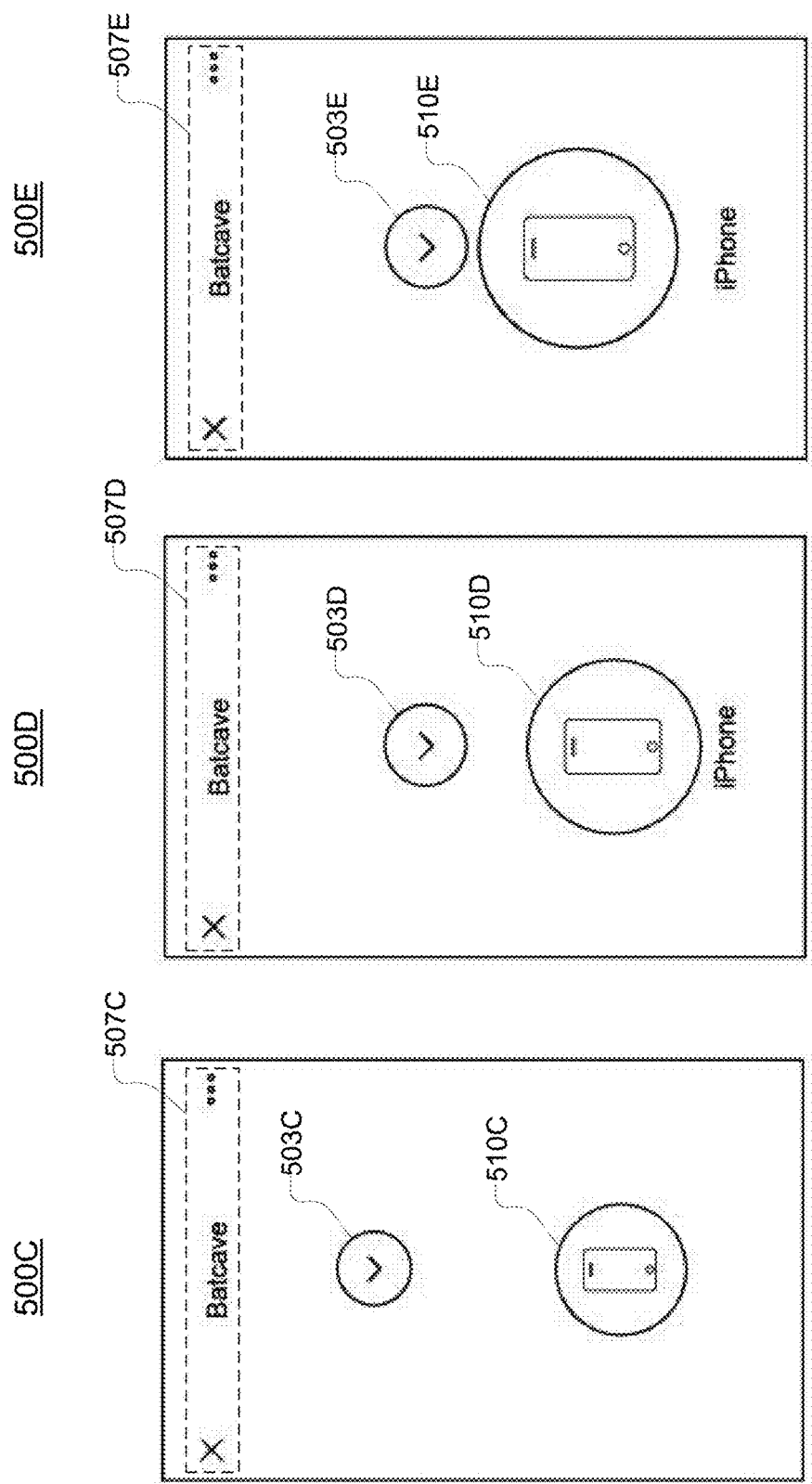

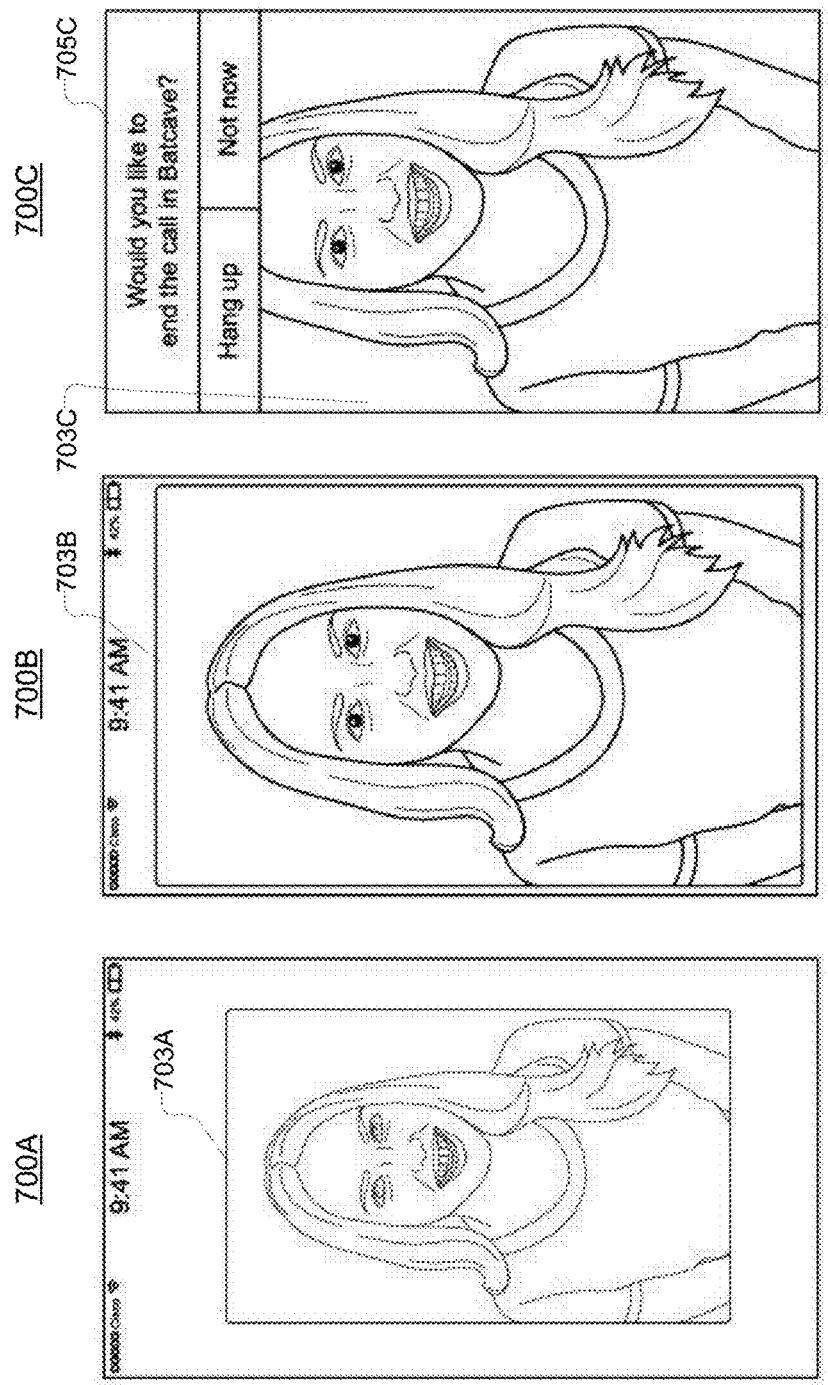

USER INTERFACE FOR PROXIMITY BASED TELECONFERENCE TRANSFER

BACKGROUND

1. Technical Field

The disclosed technology relates to methods and systems for providing a user interface to facilitate transfer of a teleconference between a meeting center system and a mobile device.

2. Introduction

With the increasing ubiquity of network connectivity, as well as improvements in data speeds, IP-based teleconferencing has become very popular. Due to the multiuser nature of teleconference calls, it is not uncommon for one or more users to leave and/or join an ongoing teleconference. In conventional meeting center systems, in order to transfer a call from a mobile device to the meeting center system, a joining user needs to end any ongoing calls on his/her device and dial into the teleconference using the meeting system hardware. Similarly, a user departing a teleconference conducted at the meeting center system would need to separately dial-in to the teleconference using his/her device in order to maintain connectivity.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIGS. 1A and 1B illustrate an example of a graphical user interface (UI) used to provide user selectable options for initiating a teleconference transfer, according to some aspects of the technology.

FIGS. 2A-2C illustrate examples of various phases of a UI display provided during the process of initiating a teleconference transfer.

FIGS. 3A-3C illustrate examples of various phases of a UI display provided during the process of performing a teleconference transfer, including display of a call destination icon representing the destination teleconference meeting center.

FIGS. 5A and 5B illustrate additional examples of UI displays to provide control options for an ongoing teleconference, including options for transferring the teleconference back to the mobile device.

FIGS. 5C-5E illustrate examples of a UI at various stages of a teleconference transfer from a conference center system to a mobile device.

FIGS. 7A-7C illustrate examples of a UI display provided after a teleconference has been successfully transferred from a conference center system to a mobile device.

DESCRIPTION OF EXAMPLE EMBODIMENTS

Figure 3E:
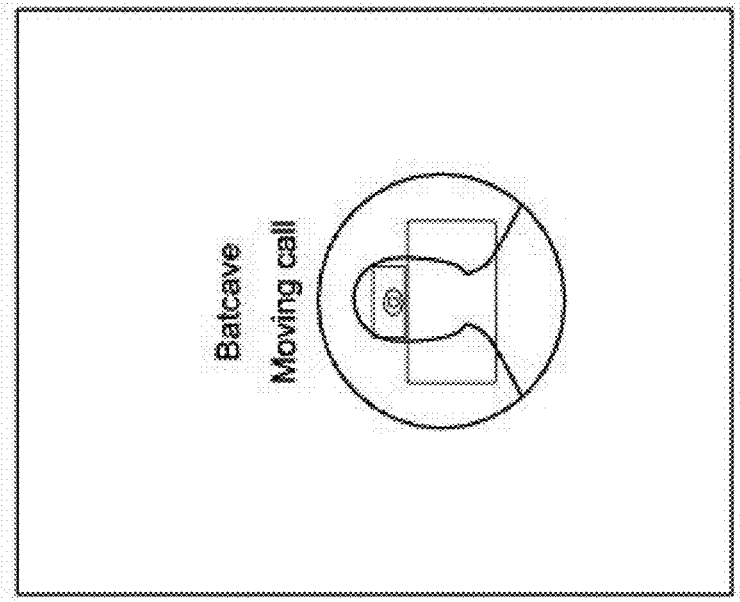
FIGS. 3D and 3E illustrate an example of a UI display provided during the completion of a teleconference transfer process.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Aspects of the disclosed technology relate to systems and methods for transferring a teleconference between a mobile device and a conference center (e.g., a meeting center system). Steps performed to implement some methods of the technology can include operations for identifying, by a mobile device, a candidate meeting center system for transfer of a teleconference conducted on the mobile device, and in response to identifying the candidate meeting center system, generating a user interface (UI) to provide one or more user selectable icons, the user selectable icons configured to facilitate transfer of the teleconference from the mobile device to the candidate meeting center system. Systems and computer readable media are also provided.

Description

Aspects of the disclosed technology address various limitations of conventional meeting center systems by providing a user interface (UI) for conveniently transitioning teleconference connectivity between devices, such as a meeting center system and a mobile device. As used herein, "meeting center," "meeting center system" and "conference center" can refer to one or more hardware and/or software systems implemented for conducting a teleconference in a particular meeting location, such as an office, conference room, or classroom, etc. Additionally, as used herein, a user's "mobile device" can refer to any of a variety of portable electronic devices that can be configured for transferring teleconference operation to and/or from the meeting center system. By way of non-limiting example, a mobile device can include any one of: a smart phone, a personal desktop assistant (PDA), a tablet computing device, a smart-watch device, or the like.

In one aspect, a UI is provided that automatically and intuitively directs a user to merge/transfer a telephone call (or video conference), depending on whether the user is arriving, at or departing from, a meeting center system location.

In some implementations, the UI can provide one or more prompts to the user in response to detecting that the user's device is located in close proximity to the meeting center system. Although determinations of proximity (e.g., between a mobile user device and the meeting center system) can be implementation specific, in some aspects, determinations can be made using a sound signal, such as a sonar signal. For example, a sonar signal emitted by the meeting center can be detected at the mobile device, verifying the mobile device's proximity. In this manner, the meeting center system and/or the user's mobile device can infer that the user is near the meeting center system and therefore likely to desire the transfer of teleconference management between devices. It is understood that other methods for determining device proximity can be implemented, without departing from the scope of the technology.

As discussed in further detail below, a detected proximity between the user's device and the meeting center system can trigger the display of various user selectable buttons and/or messages to intuitively guide the user through the teleconference transfer process. For example, upon identifying a proximately located meeting center system, a UI can be provided on a screen of the user's device e.g., to indicate actions that can be performed to conduct the teleconference transfer. Once the required actions are performed (e.g., through user interaction with touch-screen selectable options), the UI can display the conference destination, i.e., an image of the destination meeting center system. As discussed in further detail below, other user controls can also be displayed, for example, that provide options for managing the teleconference on the meeting system (e.g., from the mobile device). Such options may include, but are not limited to, graphical icons configured to cause teleconference termination, or muting, etc.

In another aspect, the technology can provide a UI configured to facilitate the moving of a teleconference from a meeting center system onto (or back to) a user's mobile device. User prompts for transitioning the call to the mobile device can be provided in response to detected changes in mobile device proximity to the meeting center system, for example, when it is determined that the mobile device is moving away from a location of the meeting center.

In some aspects, user prompts can be provided to either continue (e.g., copy) the teleconference to the user's mobile device. Additionally, graphical prompts can be provided that enable the user to terminate the call at the meeting center location, i.e., to move the call to the user's mobile device. Various aspects of a graphical user interface (GUI) will now be described with respect to FIGS. 1-11, discussed below.

FIGS. 1A and 1B illustrate examples of graphical UI displays (e.g., UI display 100A and UI display 100B) that can be used to provide user selectable options for managing a teleconference transfer, e.g., from the mobile device to a meeting center system. FIG. 1A illustrates an example UI display 100A that is provided during an ongoing teleconference, for example, in response to the detection of a proximately located meeting center system. As discussed in further detail below, determinations of proximity between a mobile device and a meeting center system (e.g., which is a candidate for receiving a teleconference transfer) can be based on signaling provided between the meeting center system and the mobile device, such as, the receipt of a sonar signal at the mobile device.

It is understood that various UI displays, such as in the examples provided by UI display 100A, and UI display 100B, can be provided on various types of mobile devices. Such devices can include, but are not limited to, one or more of: smart phone devices, tablet computers, smart watch devices, notebook computers, and/or game consoles, etc. Additionally, the UI displays discussed herein can be provided on a variety of display screen types, such as, capacitive touchscreens, organic light-emitting diode (OLED) displays, and the like.

Additionally, in the examples provided by FIG. 1A, and FIG. 1B, UI displays 100A, and 100B, each provide an image of a teleconference user, e.g., with whom a user of the mobile device is corresponding. However, it is understood that the UI displays can provide other types of images and/or video graphics concurrent with the teleconference session, without departing from the scope of the technology. For example, an image, icon or emoji associated with the corresponding teleconference participant may be displayed by a UI on the mobile device during the duration of the teleconference.

In FIG. 1A, UI display 100A includes a call move option icon 102A that is provided at a bottom portion of UI display 100A. In this example, display 100A is provided on a touchscreen, such as a capacitive touchscreen of a smartphone device, configured to receive user input via a user's touch-engagement with the touchscreen surface. As such, call move option icon 102A is selectable through user engagement (touch) with an area of the capacitive touchscreen surface corresponding with the display of call move option icon 102A.

Call move option icon 102A can include information, such as text, that can be useful in providing user guidance for interaction with the call move option icon. In the example of FIG. 1A, call move option icon 102A contains a user engagement instruction, including text for directing the user to "drag up to move call." It is understood that call move option icon 102A can include additional and/or different user engagement instructions, depending on the desired implementation. Additionally, as discussed in further examples below, user engagement instructions can be provided independently from a call move option icon, and located in other areas within the UI display.

FIG. 1B illustrates another example of a UI display 100B that includes call move option icon 102B. In the example provided by UI display 100B, call move option icon 102B includes a user engagement image, e.g., that provides useful hints as to how a user can select the displayed call move option icon 102B. In this example, the user engagement image comprises an up-arrow, indicating user engagement with the call move option icon in an upward direction, with respect to the UI display orientation, needed to initiate the teleconference transfer.

In some approaches, the displayed UI can alternate between different display states. For example, during an ongoing teleconference and upon detection of a proximately located candidate meeting center system, the mobile device can cause the UI display to alternate between UI display 100A, and UI display 100B. That is, the call move option icon can vacillate between call move option icon 102A (providing textual user instructions), and call move option 102B (providing graphical user instructions). The dynamic nature of the UI display can serve to further instruct the user about how to transfer the teleconference.

FIGS. 2A-2C illustrate various phases of an example UI display provided during the process of performing a teleconference transfer. In particular, FIG. 2A illustrates an example UI display 200A that includes user engagement icon 202A at a bottom portion of UI display 200A. UI display 200A also provides a user engagement instruction 201 (e.g., the text "drag up to move call"), in a top portion of the display, as well as a video window 203A, for example, that provides a video or image representation of the party with whom the teleconference is being conducted. As discussed above, user engagement instructions can be provided at various locations within the user interface, including as part of, or within, a user engagement icon.

FIGS. 2B and 2C illustrate example UI displays (200B, 200C) that represent the progression of display changes after user engagement with UI display 200A has begun. As illustrated by the various UI displays (200A-C), the graphics provided by the user interface (including user engagement instruction 201 (not illustrated), user engagement icon 202B and video window 203B), can begin to move in a manner consistent with the direction of a user's engagement with a touchscreen on which the displays are provided. In the illustrated examples, a video window (202B, 202C), user engagement icon (202B, 202C), and the user engagement instruction move in an upward direction concurrent with the user's progressive engagement with user engagement icons 202A, 202B, and 202C.

FIGS. 3A-3C illustrate examples of phases of UI displays (300A, 300B, and 300C, respectively) provided during the process of performing a teleconference transfer. Displays 300A-C variously include call move option icons (305A, 305B, 305C), and call destination icons (307A-C). UI displays 300A and 300B also include partial displays of video windows (309A and 309B, respectively)—which provide a video feed for the teleconference being conducted on the mobile device before the transfer is completed.

FIGS. 3B and 3C illustrate UI displays (300B, 300C) depicting the progression of the call transfer process, e.g., to a conference center destination entitled "Batcave." As illustrated by UI display 300B, the teleconference transfer process is performed as the user slides call move option icon 305B toward call destination icon 307B. UI display 300C from FIG. 3C provides an example of the graphical depiction provided when the teleconference transfer is completed. For example, UI display 300C includes user engagement instruction 311, which delivers user instructions for how to complete the teleconference transfer, i.e., "released to move call."

Figure 3D:
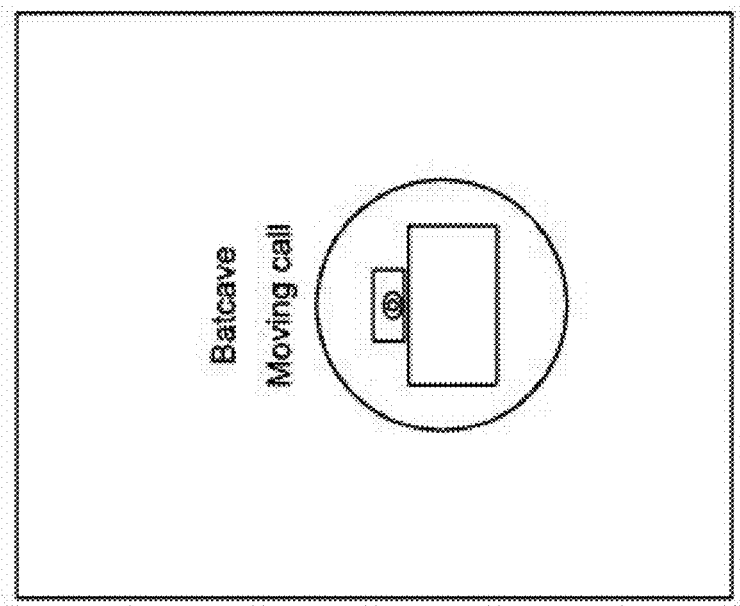

FIGS. 3D and 3E illustrate examples of UI displays (300D, 300E) provided during the completion of a teleconference transfer. FIG. 3D illustrates UI display 300D that provides a graphic indicating a status (e.g., "moving call") of the teleconference transfer, as well as an indication of the new teleconference location (e.g., "Batcave"). FIG. 3E illustrates an example of the graphical depiction of the teleconference transfer completion process that includes the fading in of user image or picture, indicating a user (or group of users) with whom the teleconference is being conducted at the transferee location.

Figure 4B:
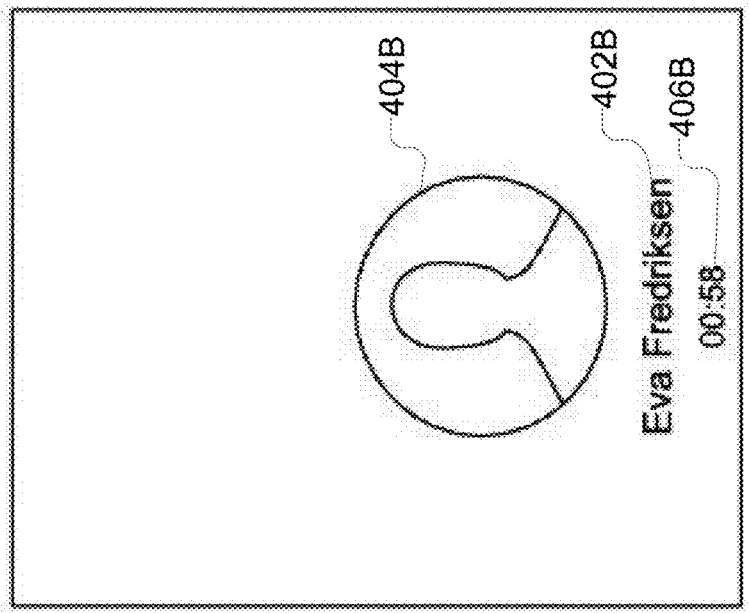
FIGS. 4A and 4B illustrate examples of a UI display after the completion of a teleconference transfer, e.g., from a mobile device to a conference center system.
Figure 4A:
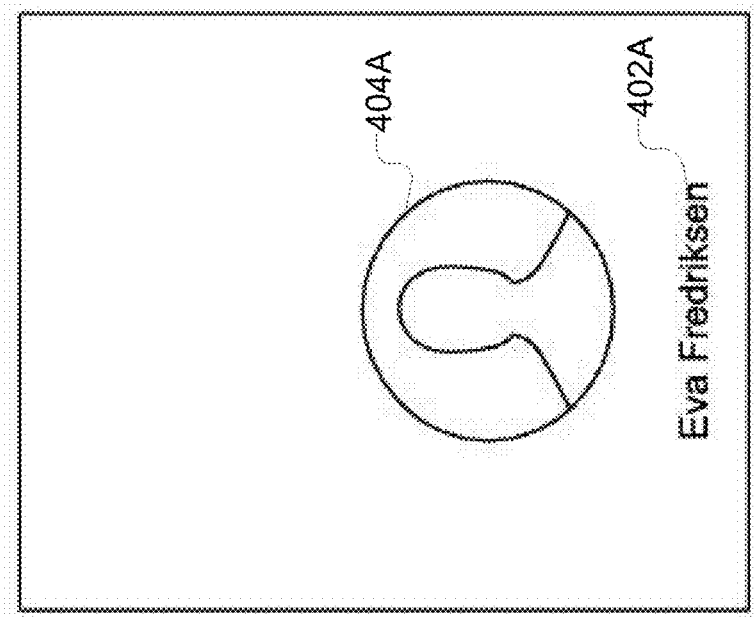

FIGS. 4A and 4B illustrate examples of UI displays (400A, 400B) provided after completion of a teleconference transfer. That is, FIGS. 4A/B illustrate graphical displays 400A/B provided on the mobile device that display information relating to the teleconference that has been transferred to the meeting center system. In the example of FIGS. 4A/B, UI displays 400A/B indicate a name 402A/B and graphical icon 404A/B associated with the party with whom the transferred teleconference is conducted (e.g., "Eva Fredriksen"), as well as an image or picture relating to Eva Fredriksen. Additionally, FIG. 4B illustrates a graphical display 400B similar to that of FIG. 4A, with the addition of call duration indicator 406 (e.g., 00:58 seconds) indicating a time duration for the transferred teleconference.

Figure 4D:
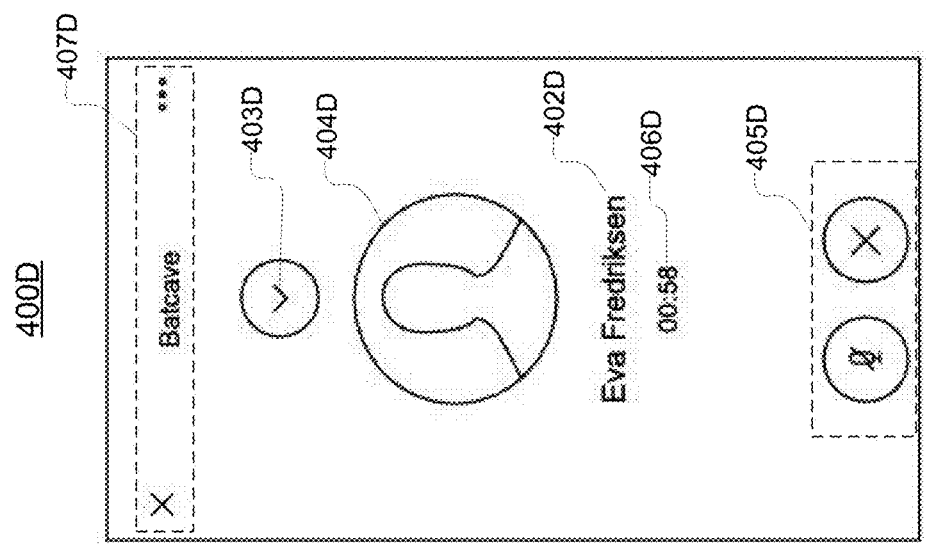
FIGS. 4C and 4D illustrate examples of various UI displays that can be provided to facilitate control of the transferred teleconference on the meeting center system.
Figure 4C:
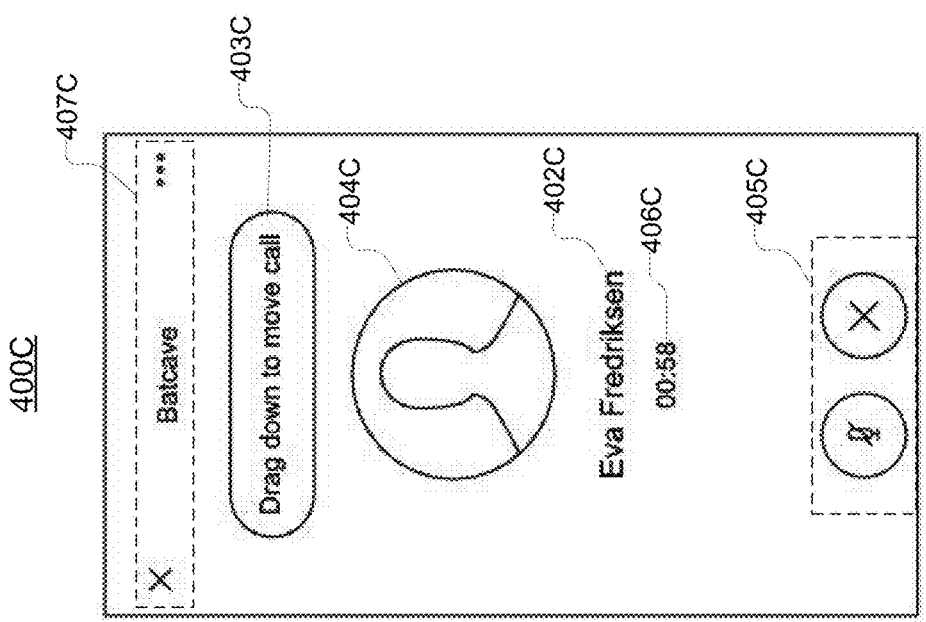

FIGS. 4C and 4D variously provide examples of UI displays (400C, 400D) provided on a mobile device that provide additional control options for a transferred teleconference that is actively conducted on a meeting center system (not illustrated). In particular, FIG. 4C/D illustrate UI displays 400C/D that includes a few of the display options discussed above, e.g., a name 402C/D of the teleconference party, a graphical icon of the teleconference party 404C/D, and a teleconference duration indicator 406C/D. However, UI displays 400C/D additionally include a call move option icon 403C/D that provide a user selectable option for transferring the teleconference from the meeting center system back to the mobile device. Similar to the example discussed above with respect to FIGS. 1-3, call move option icons 403C/D can include a user engagement instruction (e.g., 403C), or a user engagement image (e.g., 403D) that provides user information to guide the user in completing the teleconference transfer.

As further illustrated, UI displays 400C/D also include teleconference controls 405C/D that provide various user selectable options for controlling the teleconference being conducted on the conference center system. In the provided example, teleconference controls 405C/D include options for terminating the teleconference or muting the teleconference. However, it is understood that additional or different teleconference controls can be provided, without departing from the scope of the technology.

Additionally, UI displays 400C/D include user selectable management options 407C/D for facilitating management of the teleconference control interface. In particular, management options 407C/D provide options for exiting the teleconference management system, and also provide information identifying a location of location where the transferred teleconference is actively conducted (i.e., "Batcave").

FIGS. 5A-5E variously illustrate examples of UI displays (500A-E, respectively) provided throughout the process of transferring a teleconference from a meeting center system to the mobile device. In the example of FIG. 5A, UI display 500A includes a name 502A (e.g., indicating a name with whom the teleconference is conducted), a call transfer option icon 503A (e.g., for moving the teleconference back to the mobile device), a graphical icon 504A (e.g., graphically indicating a party with whom the teleconference is conducted), as well as call control options 505A and management options 507A.

Once the teleconference transfer process has been initiated, for example, through user engagement with call transfer option icon 503A, some of the graphical displays associated with the teleconference are no longer displayed (e.g., graphical icons and call control options). Turning to FIG. 5B, UI display 500B provides management options 507B, as well as destination icon 510B representing a destination location available for the teleconference transfer, i.e., the mobile device. The example UI display 500B of FIG. 5B illustrates an example of the display changes that occur once a user begins to initiate the teleconference transfer back to the mobile device.

FIGS. 5C-5E show the graphical progression of the transfer process. For example, UI display 500C illustrates call transfer option icon 503C and destination icon 510C. As the user moves the call transfer option icon 503D/E toward destination icon 510D/E, the transfer of the teleconference back to the mobile device is completed.

Figure 6B:
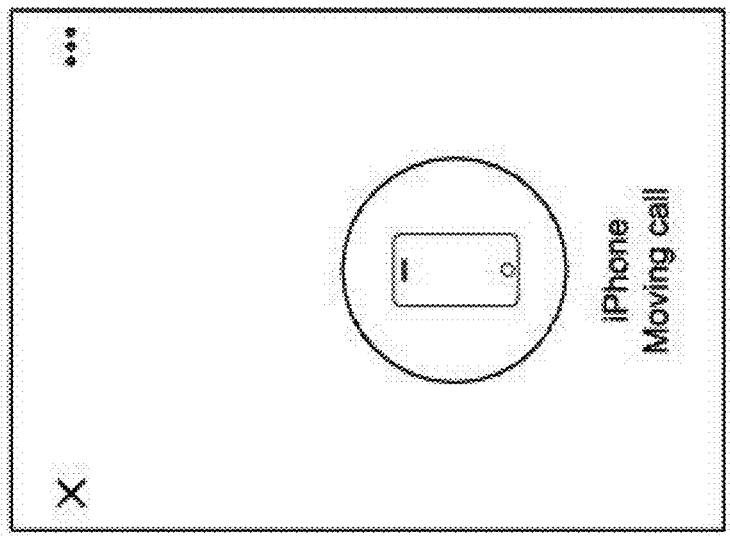
FIGS. 6A and 6B illustrate examples of a UI provided at the completion of a teleconference transfer from a conference center system to a mobile device.
Figure 6A:
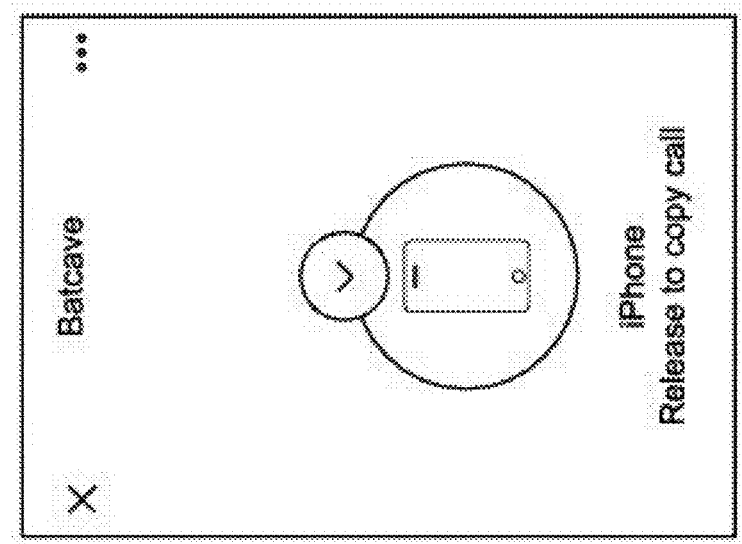

FIGS. 6A and 6B illustrate examples of a UI display provided at the completion of a teleconference transfer from a conference center system to a mobile device. Similar to the example provided above with respect to FIGS. 3C-E, UI display 600A can include a user engagement instruction (e.g., "Release to copy call") that provides information to a user that can provide instruction for completing the teleconference transfer.

FIG. 6B illustrates an example of a UI display 600B which provide a status indicator as the conference center to mobile device transfer is completed. That is, UI display 600B includes a status instruction to indicate the transfer progress by displaying: "Moving call."

FIGS. 7A-7C illustrate examples of UI displays (700A-C) provided after a teleconference has been successfully transferred from a conference center system to a mobile device. As illustrated in the examples of FIGS. 7A-C, each of UI displays 700A-C provide a video window (e.g., 703A-C) that provides a video feed displaying a party with whom the newly transferred teleconference is conducted. Additionally, in the example of FIG. 7C, UI display 700C provides a set of user selectable teleconference control options 705C, for example, that provide user selectable options for managing various aspects of the teleconference at the previous location, i.e., at the meeting center system. In the illustrated example, teleconference control options 705C include options for terminating the teleconference on the meeting center system.

Figure 8:
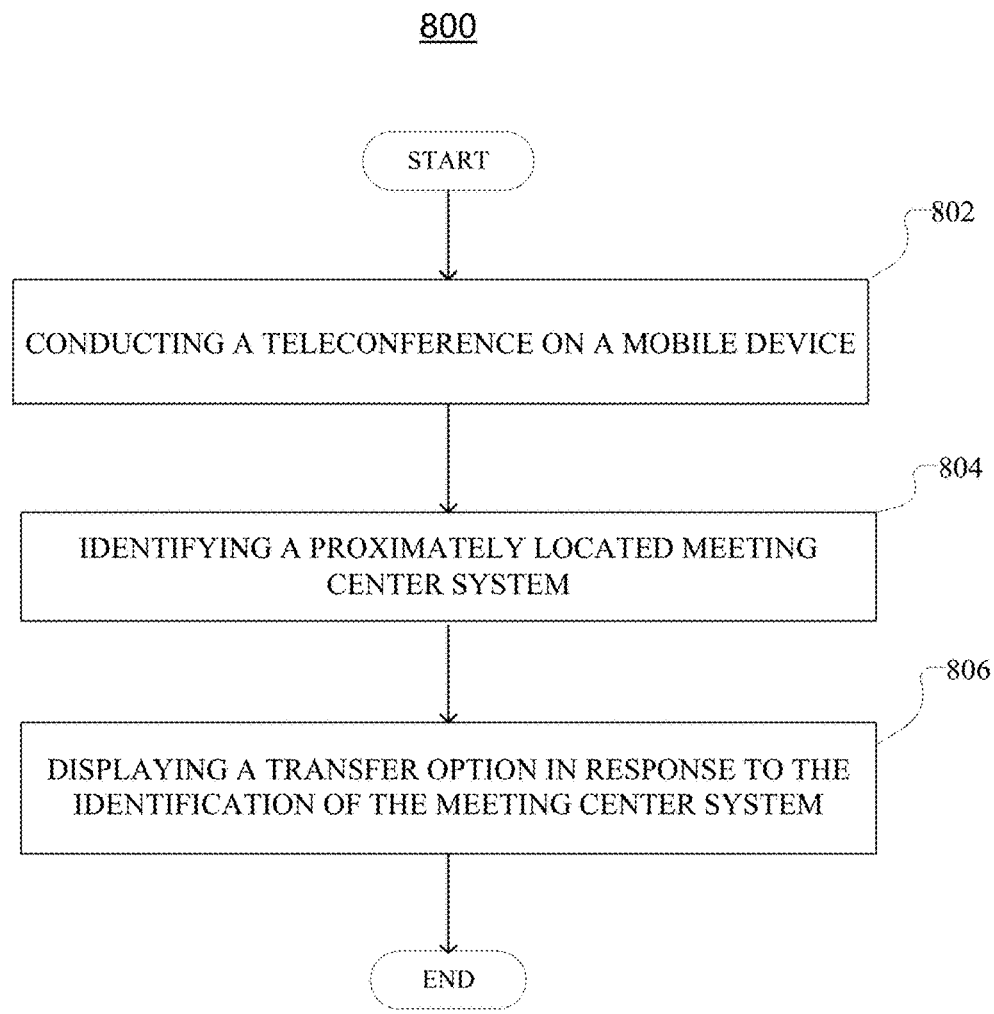
FIG. 8 illustrates steps of an example method for transferring a teleconference between a conference system and a mobile device.

FIG. 8 illustrates steps of an example method 800 for transferring a teleconference e.g., between a conference system and a mobile device, according to some aspects of the technology. Method 800 begins with step 802 in which a teleconference is actively conducted on a user's mobile device. Depending on implementation, the same teleconference can also be concurrently conducted on the meeting center system (e.g., before the teleconference transfer is initiated).

In step 804, a proximately located meeting center system is identified. Proximity between a candidate meeting center system (i.e., one capable and authorized to receive the teleconference transfer) can be accomplished using various methods. As discussed above, proximity between the meeting center system and the mobile device can be determined at the mobile device through receipt of an inaudible sound signal, such as a sonar signal. In other aspects, location information of the meeting center system and the mobile device can be used to identify proximity between devices. For example, geolocation information, e.g., that is obtained using a geolocation positioning system (GPS), can be used to determine device proximity.

In step 806, in response to identifying the proximately located meeting center system, a user interface (UI) is provided by the mobile device to provide one or more transfer options to enable a user to transfer (e.g., move or copy) an ongoing teleconference from the mobile device to the meeting center system.

In some aspects, methods of the subject technology also provide ways to facilitate the transfer of a teleconference conducted on the meeting center system to a user's his/her mobile device. Similar to the methods described above, it can be determined (e.g., at the mobile device and/or meeting center system) that the mobile device is leaving a location proximate to the meeting center system. By way of example, determinations that the mobile device is leaving can be made when the mobile device loses contact with an audible signal, such as a sonar signal, emitted by the meeting center system. Further to the above examples, geolocation information (e.g., determined using one or more GPS systems) can be used to identify a departing mobile device.

In response to detecting the departure of a mobile device from the meeting center location, aspects of the subject technology can be used to provide a user interface display (e.g., a UI display), similar to those embodiments discussed above with respect to FIGS. 4C, 4D, and 5A-5E.

Figure 9:
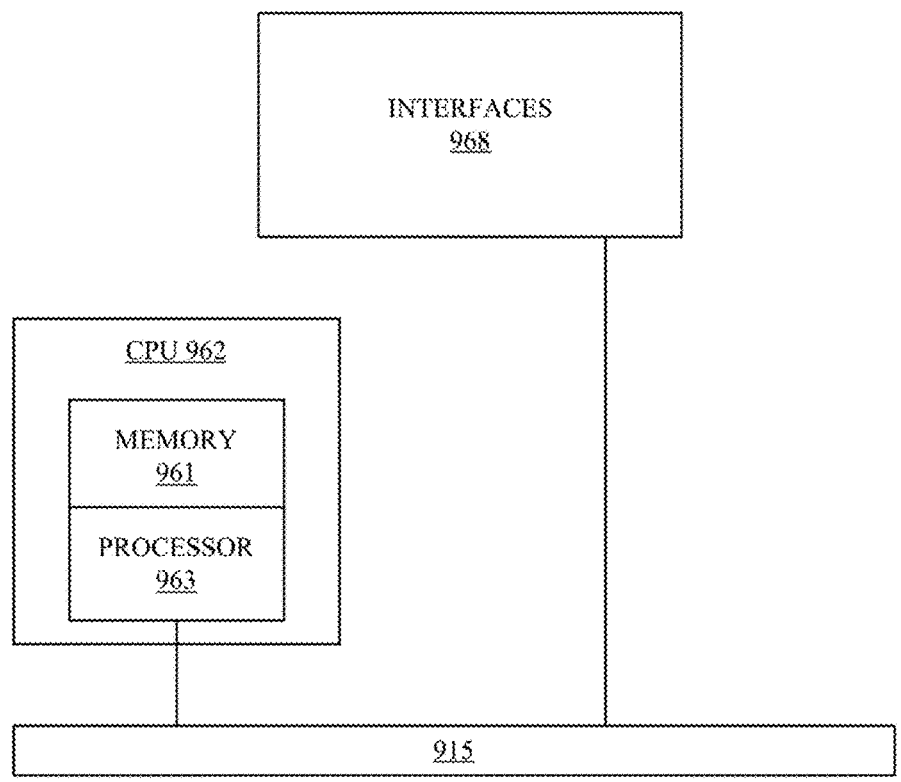
FIG. 9 illustrates an example of an electronic system with which some aspects of the subject technology can be implemented.

FIG. 9 illustrates an example of an electronic system with which some aspects of the subject technology can be implemented. Specifically, FIG. 9 illustrates an example network device 910, which could include, but is not limited to a mobile device, such as a smart phone, a notebook computer, or a tablet computing device.

Network device 910 includes a master central processing unit (CPU) 962, interfaces 968, and a bus 915 (e.g., a PCI bus). When acting under the control of appropriate software or firmware, the CPU 962 is responsible for executing packet management, error detection, and/or routing functions. The CPU 962 preferably accomplishes all these functions under the control of software including an operating system and any appropriate applications software. CPU 962 can include one or more processors 963 such as a processor from the Motorola family of microprocessors or the MIPS family of microprocessors. In an alternative embodiment, processor 963 is specially designed hardware for controlling the operations of router 910. In a specific embodiment, a memory 961 (such as non-volatile RAM and/or ROM) also forms part of CPU 962. However, there are many different ways in which memory could be coupled to the system.

The interfaces 968 can be provided as interface cards (sometimes referred to as "line cards"). Generally, they control the sending and receiving of data packets over the network and sometimes support other peripherals used with a router. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 962 to efficiently perform routing computations, network diagnostics, security functions, etc.

Although the system shown in FIG. 9 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 961) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 10A:
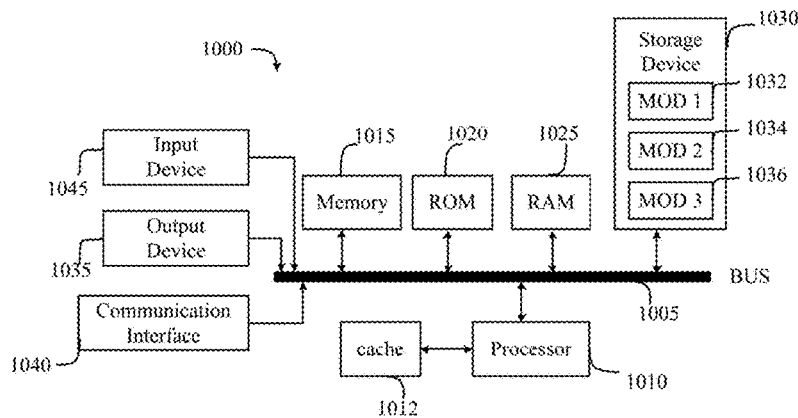
FIGS. 10A and 10B illustrate example system embodiments.
Figure 10B:
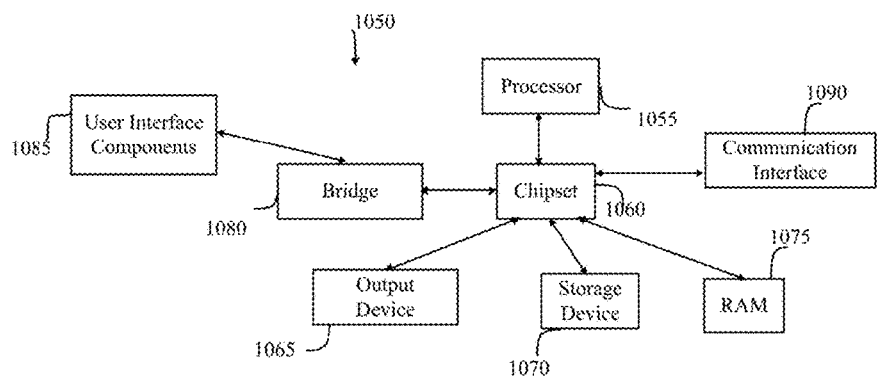

FIG. 10A and FIG. 10B illustrate example system embodiments. Those of ordinary skill in the art will also readily appreciate that other system embodiments are possible.

FIG. 10A illustrates a system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. System 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 can be available for use as well. Memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor can be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates an example computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output device 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that example systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method comprising:
   identifying, by a mobile device, a candidate meeting center system for transfer of a teleconference conducted on the mobile device;
   in response to identifying the candidate meeting center system, generating a user interface (UI) to provide one or more user selectable icons, the user selectable icons configured to facilitate transfer of the teleconference from the mobile device to the candidate meeting center system; and
   in response to transfer of the teleconference from the mobile device to the candidate meeting center system, the generating a user interface (UI) to provide one or more user selectable icons, the user selectable icons configured to provide remote control options at the mobile device to control aspects of the teleconference hosted on the candidate meeting center system;
   wherein the remote control options include at least volume control of the teleconference, termination of the teleconference, and return transfer of the teleconference from the candidate meeting center system to the mobile device;
   wherein the user selectable icons comprise a move call option and a call destination icon displayed on a touch screen of the mobile device, and
   wherein the UI is configured to initiate a transfer of the teleconference from the mobile device to the candidate meeting center system in response to a user's movement of the move call option in a direction of the call destination icon.

2. The computer-implemented method of claim 1, wherein identifying the candidate meeting center system further comprises:
   receiving a proximity signal from the meeting center system, wherein the proximity signal is configured to provide confirmation that the meeting center system is proximately located to the mobile device.

3. The computer-implemented method of claim 2, wherein the proximity signal comprises an audible signal.

4. The computer-implemented method of claim 1, wherein the user selectable icons comprise a call move option displayed on a touch screen of the mobile device, and
   wherein the call move option is configured for selection via a user's engagement with the call move option in an upward direction with respect to the touch screen of the mobile device.

5. The computer-implemented method of claim 1, wherein the user selectable icons comprise a call move option displayed on a touch screen of the mobile device, and
   wherein the call move option comprises a user engagement instruction that indicates a user interaction with the touch screen to initiate the transfer of the teleconference from the mobile device to the candidate meeting center system.

6. The computer-implemented method of claim 1, wherein the user selectable icons comprise a call move option displayed on a touch screen of the mobile device, and wherein the call move option comprises a user engagement image that indicates a user interaction with the touch screen to initiate the transfer of the teleconference from the mobile device to the candidate meeting center system.

7. A system for facilitating transfer of a teleconference from a mobile device to a candidate meeting center system, the system comprising:
one or more processors; and
a computer-readable medium comprising instructions stored therein, which when executed by the one or more processors, cause the one or more processors to perform operations comprising:
identifying, by a mobile device, a candidate meeting center system for transfer of a teleconference conducted on the mobile device;
in response to identifying the candidate meeting center system, generating a user interface (UI) to provide one or more user selectable icons, the user selectable icons configured to facilitate transfer of the teleconference from the mobile device to the candidate meeting center system; and
in response to transfer of the teleconference from the mobile device to the candidate meeting center system, the generating a user interface (UI) to provide one or more user selectable icons, the user selectable icons configured to provide remote control options at the mobile device to control aspects of the teleconference hosted on the candidate meeting center system;
wherein the remote control options include at least volume control of the teleconference, termination of the teleconference, and return transfer of the teleconference from the candidate meeting center system to the mobile device;
wherein the user selectable icons comprise a move call option and a call destination icon displayed on a touch screen of the mobile device, and
wherein the UI is configured to initiate a transfer of the teleconference from the mobile device to the candidate meeting center system in response to a user's movement of the move call option in a direction of the call destination icon.

8. The system of claim 7, wherein identifying the candidate meeting center system further comprises operations for:
receiving a proximity signal from the meeting center system, wherein the proximity signal is configured to provide confirmation that the meeting center system is proximately located to the mobile device.

9. The system of claim 8, wherein the proximity signal comprises an audible signal.

10. The system of claim 7, wherein the user selectable icons comprise a call move option displayed on a touch screen of the mobile device, and
wherein the call move option is configured for selection via a user's engagement with the call move option in an upward direction with respect to the touch screen of the mobile device.

11. The system of claim 7, wherein the user selectable icons comprise a call move option displayed on a touch screen of the mobile device, and
wherein the call move option comprises a user engagement instruction that indicates a user interaction with the touch screen to initiate the transfer of the teleconference from the mobile device to the candidate meeting center system.

12. The system of claim 7, wherein the user selectable icons comprise a call move option displayed on a touch screen of the mobile device, and
wherein the call move option comprises a user engagement image that indicates a user interaction with the touch screen to initiate the transfer of the teleconference from the mobile device to the candidate meeting center system.

13. A non-transitory computer-readable storage medium comprising instructions stored therein, which when executed by one or more processors, cause the one or more processors to perform operations comprising:
identifying, by a mobile device, a candidate meeting center system for transfer of a teleconference conducted on the mobile device; and
in response to identifying the candidate meeting center system, generating a user interface (UI) to provide one or more user selectable icons, the user selectable icons configured to facilitate transfer of the teleconference from the mobile device to the candidate meeting center system; and
in response to transfer of the teleconference from the mobile device to the candidate meeting center system, the generating a user interface (UI) to provide one or more user selectable icons, the user selectable icons configured to provide remote control options at the mobile device to control aspects of the teleconference hosted on the candidate meeting center system;
wherein the remote control options include at least volume control of the teleconference, termination of the teleconference, and return transfer of the teleconference from the candidate meeting center system to the mobile device;
wherein the user selectable icons comprise a move call option and a call destination icon displayed on a touch screen of the mobile device, and
wherein the UI is configured to initiate a transfer of the teleconference from the mobile device to the candidate meeting center system in response to a user's movement of the move call option in a direction of the call destination icon.

14. The non-transitory computer-readable storage medium of claim 13, wherein identifying the candidate meeting center system further comprises operations for:
receiving a proximity signal from the meeting center system, wherein the proximity signal is configured to provide confirmation that the meeting center system is proximately located to the mobile device.

15. The non-transitory computer-readable storage medium of claim 14, wherein the proximity signal comprises an audible signal.

16. The non-transitory computer-readable storage medium of claim 13, wherein the user selectable icons comprise a call move option displayed on a touch screen of the mobile device, and
wherein the call move option is configured for selection via a user's engagement with the call move option in an upward direction with respect to the touch screen of the mobile device.

17. The non-transitory computer-readable storage medium of claim 13, wherein the user selectable icons comprise a call move option displayed on a touch screen of the mobile device, and
wherein the call move option comprises a user engagement instruction that indicates a user interaction with the touch screen to initiate the transfer of the teleconference from the mobile device to the candidate meeting center system.

\* \* \* \* \*